Nov. 17, 1964 C. E. SPINDLER 3,157,139
TRENCH CLOSER
Filed Oct. 9, 1963 2 Sheets-Sheet 1
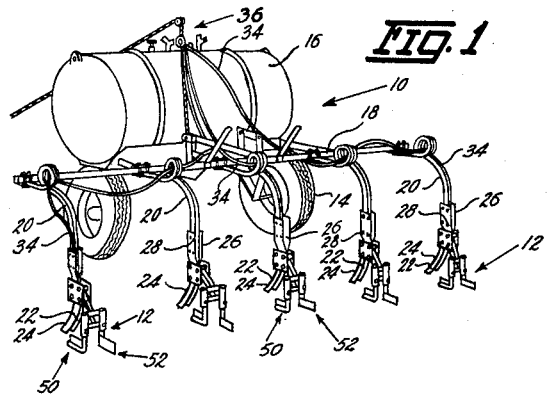
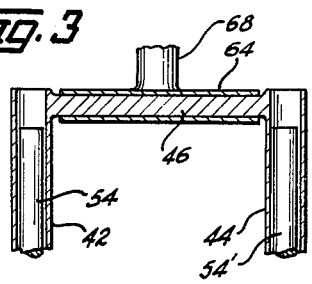
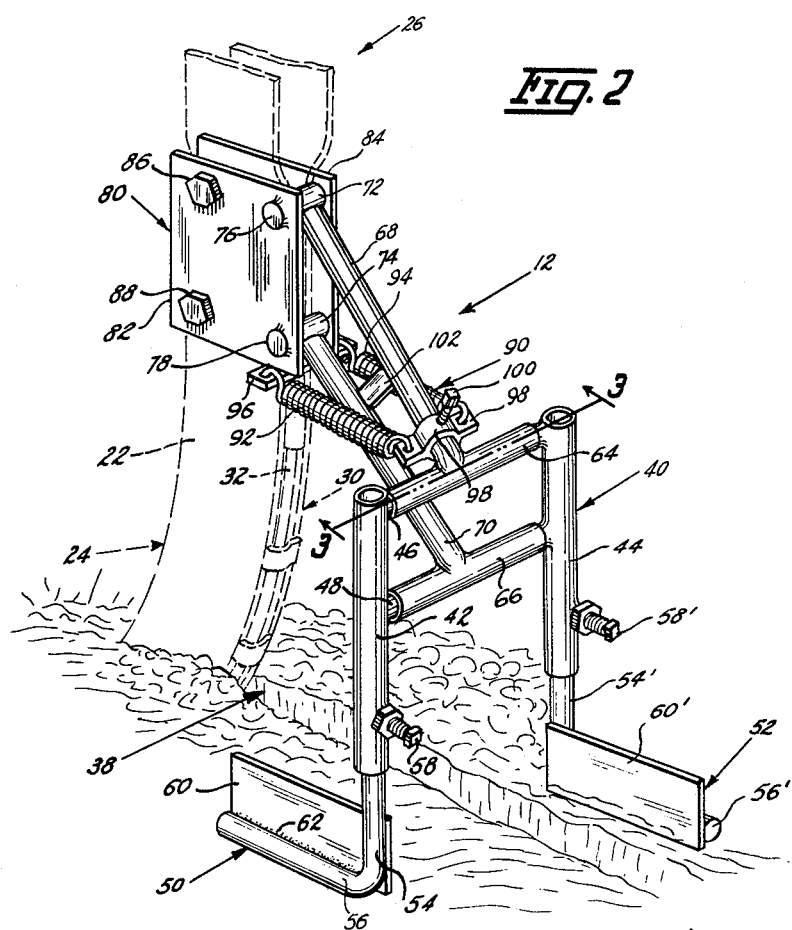
INVENTOR.
CLEMENS E. SPINDLER
BY *Morton S. Adler*
ATTORNEY.

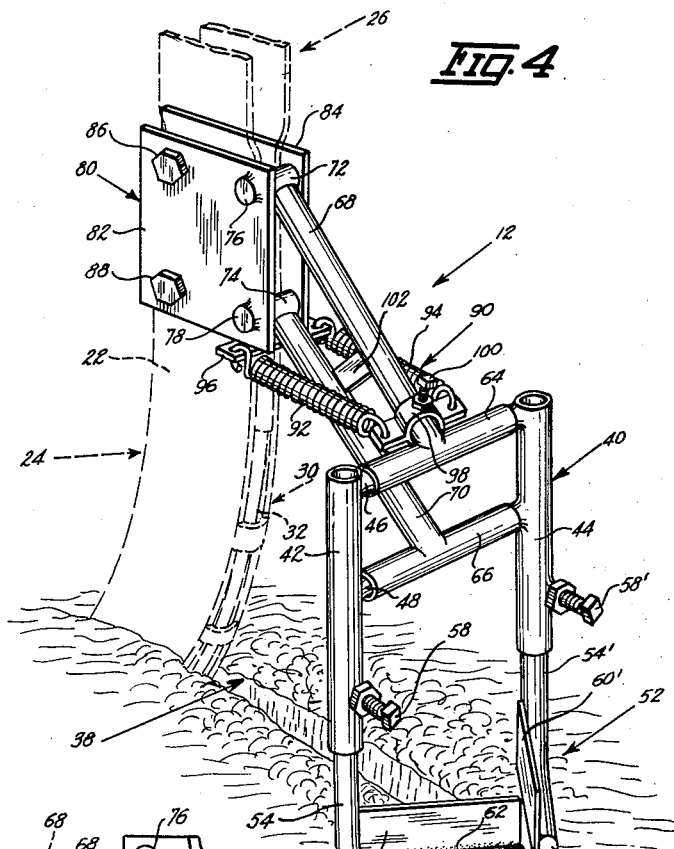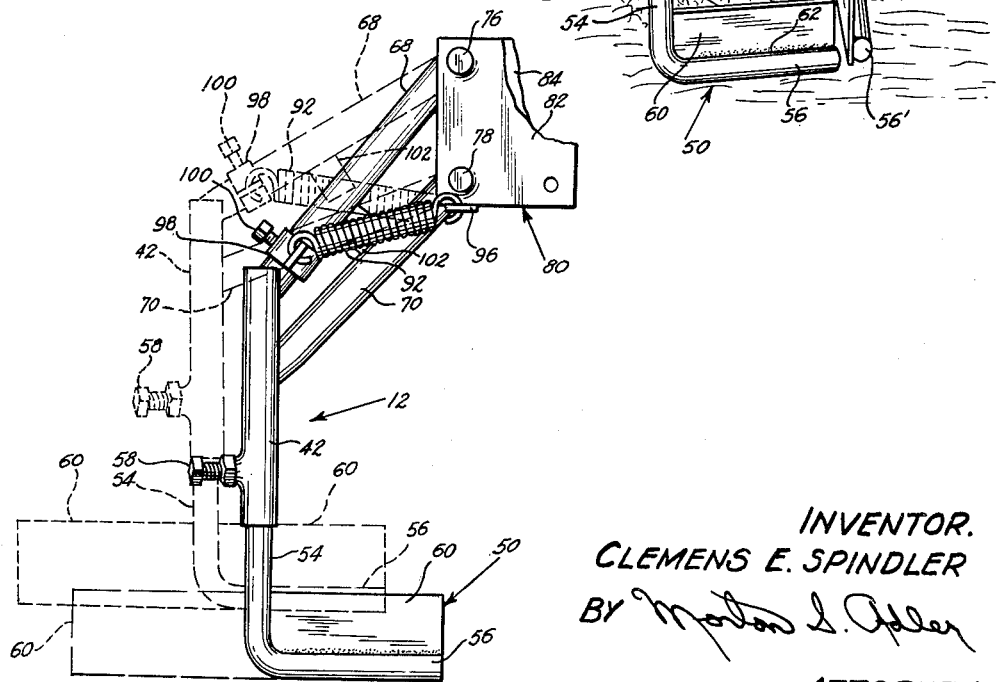

000
United States Patent Office 3,157,139
Patented Nov. 17, 1964

3,157,139
TRENCH CLOSER
Clemens E. Spindler, Sioux City, Iowa, assignor to The Broyhill Company, Dakota City, Nebr., a corporation of Nebraska
Filed Oct. 9, 1963, Ser. No. 315,040
5 Claims. (Cl. 111—7)

This invention relates to improvements in apparatus for covering or closing a relatively shallow and narrow trench or furrow created by a ground breaking tool such as a knife to which there is attached apparatus for subsurface discharging of agricultural chemicals.

One of the methods of fertilizing and fumigating soil with chemicals includes a knife means for cutting into the soil and effecting a subsurface discharge of the chemical composition being used. Such open trenches or cuts, unless suitably closed, not only contribute to erosion, but permit dissipation of certain chemicals into the air where, of course, their value as a fertilizer or fumigant may be completely lost. In this regard, one of the chief difficulties encountered has been the fact that the furrow is not closed satisfactorily or quickly enough to become suitably sealed before an appreciable amount of the composition used escapes and this situation worsens as the speed of movement of the knife and the rate of discharge of the chemical increases.

Accordingly, one of the important objects contemplated by this invention is the provision of an improved apparatus for quickly and adequately closing a trench or furrow made by a ground-engaging tool of the type characterized above for use in fertilizing and/or fumigating the soil.

More particularly this invention provides ground engaging paddle or scraper-like means carried by the knife portion of the fertilizing equipment, and disposed to immediately trail the knife in such a manner as to effectively move or direct the cut soil back into furrow filling position for locking in the solution before any appreciable amount is lost or dissipated.

A further object is to provide a trench closing apparatus of the above class which includes a fixed support on the knife, and ground engaging means movably arranged relative to the support so as to self-adjustable in remaining at the same relative position to the ground irrespective of the depth of cut by the knife.

Still another object contemplated herein is the provision of a trench closer as indicated on which the position of the dirt engaging paddles are selectively adjustable for the most effective results in closing the trench in any type of soil under normal application conditions.

A still further object includes a trench closer as characterized which is provided with an adjustable yieldable pressure means for normally holding the paddles in ground engaging position and which will permit vertical movement of the paddle supports so that the paddles automatically adjust to the contour of the soil over which they move.

To attain these objects and such further objects as may appear herein, or be hereinafter pointed out, reference is made to the accompanying drawings forming a part hereof, in which:

FIG. 1 is a reduced perspective view illustrating the use of this invention with a set of knives on a trailer unit which includes a supply tank for the chemical solution being used, FIG. 2 is a perspective view of this trench closer in use, with the knife to which it is attached being shown in broken lines for purposes of illustration, FIG. 3 is a cross-sectional view taken on the line 3—3 of FIG. 2, FIG. 4 is a perspective view similar to FIG. 2 but showing the paddle members differently positioned, and FIG. 5 is a side elevational view of this invention with its automatic adjustability relative to uneven terrain illustrated in broken lines.

Referring to the drawings, the equipment designated generally by the numeral 10 in FIG. 1 illustrates the environment in which my new trench closer 12 is used. Equipment 10 as shown includes a wheeled trailer 14 on which is mounted a suitable supply tank 16 and drawbar 18. A plurality of spaced spring-type downwardly extending arcuate supporting bars 20 are mounted to the drawbar 18 and an arcuate knife 22 is carried at the lower end of each support 20. Knives 22 are provided with a leading cutting edge 24 and include the bifurcated end 26 for embracing bars 20 to which they are attached as by pins, bolts or the like 28. On the trailing edge 30 of knives 22 there is mounted a fixed tube member 32 having its lower end extending to the lower end of edge 30 and its upper end connected to flexible tubing 34 operatively connected by valve means 36 to tank 16. No invention is claimed in the equipment so far described since it is of well-known construction and is shown here for purposes of illustration. It will, of course, be understood that trailer 14 will be hitched to a tractor or the like and as it moves over the ground, knives 22 will cut a shallow trench or furrow 38 into which chemicals from tank 16 are discharged through tubes 32 in controlled amounts as is well known. To obtain the prompt and adequate closing of trench 38 which is necessary to assure the most beneficial results from the subsurface discharge of the chemicals employed, I have designed my new trench closer to which reference is made particularly to FIGS. 2, 4 and 5 for the following description.

A frame member 40 comprises the vertically disposed spaced parallel tubular members 42 and 44 connected at their upper ends by the cross rod 46 and similarly connected by rod 48 which is in spaced parallel relationship to and below rod 46 and preferably within the upper longitudinal half portion of members 42 and 44. Respective paddle assemblies 50 and 52 are mounted to the respective members 42 and 44 and since they are of like structure, assembly 50 will be described in detail and like numerals primed will be given to assembly 52.

An L-shaped rod defined by the vertical arm 54 and horizontal arm 56 has arm 54 telescopically disposed in the lower end of member 42 (44 for arm 54') so that it is extensible, retractable and rotatable relative thereto and may be fixed at any selective position by a set screw or bolt 58. An elongated preferably rectangular paddle or plate 60 is secured to one side of arm 56 in any suitable manner such as by welding 62 and is also secured to the lower portion of arm 54 whereby it is vertically disposed with its longitudinal edges on a horizontal plane and with the lowermost of such edges coplanar with the bottom of arm 56.

Tubular sleeves or collars 64 and 66 are rotatably journalled on the respective cross rods 46 and 48 so as to extend between members 42 and 44, and extending perpendicularly from the center of each sleeve 64 and 66 are rigid connecting links in the form of the respective elongated tubular connecting arm members 68 and 70. Arms 68 and 70 terminate in the respective transverse tubular bearing collars 72 and 74 which are pivotally supported on the respective pins or rivets 76 and 78 in the parallelogram mounting unit 80. Unit 80 comprises a pair of square rigid support plates 82 and 84 held in spaced juxtaposition by rivets 76 and 78 which are in vertically spaced positions along one edge of unit 80 as shown. This permits unit 80 to embrace the shank of knife 22 just below portion 26 and to be removably secured thereto by the vertically spaced bolts and nuts 86 and 88 which preferably pass through the knife shank although if unit 80 is made large enough, such bolts may pass exteriorly of the edge of the knife shank. By such arrangement, the upper and lower edges of unit 80 are transversely disposed to the longitudinal axis of knife 22 and will thus be parallel or substantially so, to the ground when in operating position.

A spring assembly 90 includes a pair of spaced tension springs 92 and 94 disposed at opposite sides of arms 68 and 70 and each connected at one corresponding end to opposed ends of a cross bar 96 secured across the bottom of plates 82 and 84 below pin 78. The opposite ends of springs 92 and 94 are similarly attached to opposite ends of a collar or fitting 98 which is slidably arranged on the tubular arm 68 and selectively positionable longitudinally thereof by means of the set screw 100 to correspondingly adjust the tension of assembly 90. With assembly 90 extending between the upper extremity of frame 40 and the lower end of the parallelogram unit 80 and with unit 80 attached to knife 22 as described, frame 40 is normally and yieldingly urged downwardly (FIGS. 2 and 4) so that the upper ends of tubular members 42 and 44 are below the plane of the lower edge of unit 80 and arms 68 and 70 are inclined upwardly from frame 40 to unit 80. The depth of such downward movement is limited by a stop member 102 in the form of a boss or stud which depends from arm 68 so as to abut arm 70 as shown.

In the operation of this trench closer, paddle assemblies 50 and 52 will be adjusted longitudinally of members 42 and 44 in relation to the depth of cut contemplated by knife 22 so that they move freely over the surface of the ground and this position will be automatically maintained irrespective of the contour of the ground traversed by because of the structure of spring assembly 90. In addition, because of the arrangement of unit 80, the relative movement of frame 40 over uneven ground will maintain paddle assemblies 50 and 52 in the same relative position to the ground.

As indicated above, paddle assemblies 50 and 52 are also rotatably adjustable to obtain the most effective results in closing the trench 38 and, for example, under conditions where the cut soil may be in a freely flowable state, the positions of the paddles parallel to the trench 38 as seen in FIG. 2 will effectively serve as a splashboard to direct the cut soil directly back into the trench. On the other hand, where the soil may be of such a consistency that it must be forcibly moved, the wedge position of the paddles as shown in FIG. 4 may be employed to actually scrape the dirt back into trench 38 and, as will be apparent, various angular positions of the paddles in this arrangement can be used to produce a more or less flat or mounded surface over the trench.

It is submitted that the invention shown and described is aptly suited to achieve the purposes intended and is characterized by a combination of highly useful and mutually cooperating elements that combine their respective and proportionate functions in accomplishing the objects sought to be obtained.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:

1. In apparatus for the subsurface discharging of agricultural chemicals and which includes a ground engaging knife for opening a trench or furrow in the soil as it is moved over the ground, the combination therewith of apparatus for closing such trench or furrow comprising:
   a frame disposed in a trailing position relative to said knife,
   a pair of spaced ground engaging paddle assemblies carried by said frame so as to be disposed at respective opposite sides of said trench,
   said paddle assemblies each including a vertically disposed planar paddle member,
   a support plate removably secured to said knife,
   a pair of elongated arms each pivotally connected at one corresponding end at vertically spaced points on said frame,
   the other corresponding ends of said arms pivotally connected at vertically spaced points on said support plate,
   spring means extending between one of said elongated arms and said support plate to normally urge said paddle assemblies downwardly into ground engaging position, and
   a stop member on one of said arms adapted to abut said other arm at a predetermined point of downward movement.

2. In apparatus for the subsurface discharging of agricultural chemicals and which includes a ground engaging knife for opening a trench or furrow in the soil as it is moved over the ground, the combination therewith of apparatus for closing such trench or furrow comprising:
   a frame disposed in a trailing position relative to said knife,
   a pair of spaced ground engaging paddle assemblies carried by said frame so as to be disposed at respective opposite sides of said trench,
   said paddle assemblies each including a vertically disposed planar paddle member,
   a support plate removably secured to said knife,
   a pair of elongated arms each pivotally connected at one corresponding end at vertically spaced points on said frame,
   the other corresponding ends of said arms pivotally connected at vertically spaced points on said support plate,
   spring means extending between one of said elongated arms and said support plate to normally urge said paddle assemblies downwardly into ground engaging position,
   a stop member on one of said arms adapted to abut said other arm at a predetermined point of downward movement, and
   means movable on one of said arms to selectively adjust the tension on said spring means.

3. In apparatus for the subsurface discharging of agricultural chemicals and which includes a ground engaging knife for opening a trench or furrow in the soil, the combination therewith of apparatus for closing such trench or furrow comprising:
   a frame disposed in a trailing position relative to said knife,
   a pair of spaced ground engaging paddle assemblies carried by said frame so as to be disposed at respective opposite sides of said trench,
   a support plate removably secured to said knife,
   a pair of elongated arms each pivotally connected at one corresponding end at vertically spaced points on said frame,
   the other corresponding ends of said arms pivotally connected at vertically spaced points on said support plate,
   a slidable collar on one of said arms,
   means to anchor said collar at predetermined points on said arm,
   spring means extending between said collar and said support plate to normally urge said paddle assemblies downwardly into ground engaging position, said collar affording means for adjusting tension on said spring means, and a stop member on one of said arms adapted to abut said other arm at a predetermined point of downward movement.

4. A device as defined in claim 3 including means for selectively positioning said paddle assemblies in parallel and non-parallel relationship to the longitudinal axis of said trench.

5. In apparatus for the subsurface discharging of agricultural chemicals and which includes a ground engaging knife for opening a trench or furrow in the soil as it is moved over the ground, the combination therewith of apparatus for closing such trench or furrow comprising:

a frame disposed in a trailing position relative to said knife, a pair of spaced ground engaging paddle assemblies carried by said frame so as to be disposed at respective opposite sides of said trench, said paddle assemblies each including a vertically disposed planar paddle member, a support plate removably secured to said knife, a pair of elongated arms each pivotally connected at one corresponding end at vertically spaced points on said frame, the other corresponding ends of said arms pivotally connected at vertically spaced points on said support plate, and spring means extending between one of said elongated arms and said support plate to normally urge said paddle assemblies downwardly into ground engaging position.

References Cited by the Examiner
UNITED STATES PATENTS

| | | | |
|---|---|---|---|
| 1,653,786 | 12/27 | Shell | 111—85 |
| 1,944,939 | 1/34 | Kunderd | 172—159 X |
| 2,722,902 | 11/55 | Hyatt | 111—7 |
| 2,736,279 | 2/56 | Johnston | 111—85 X |

OTHER REFERENCES

"Pub," Down to Earth, Winter 1954, page 5, article by B. J. Thiegs et al.; received U.S. Patents Office December 10, 1954.

ABRAHAM G. STONE, *Primary Examiner*.

WILLIAM A. SMITH III, *Examiner*.